No. 674,318. Patented May 14, 1901.
J. REY.
VEHICLE.
(Application filed Sept. 4, 1900.)
(No Model.) 2 Sheets—Sheet 1.
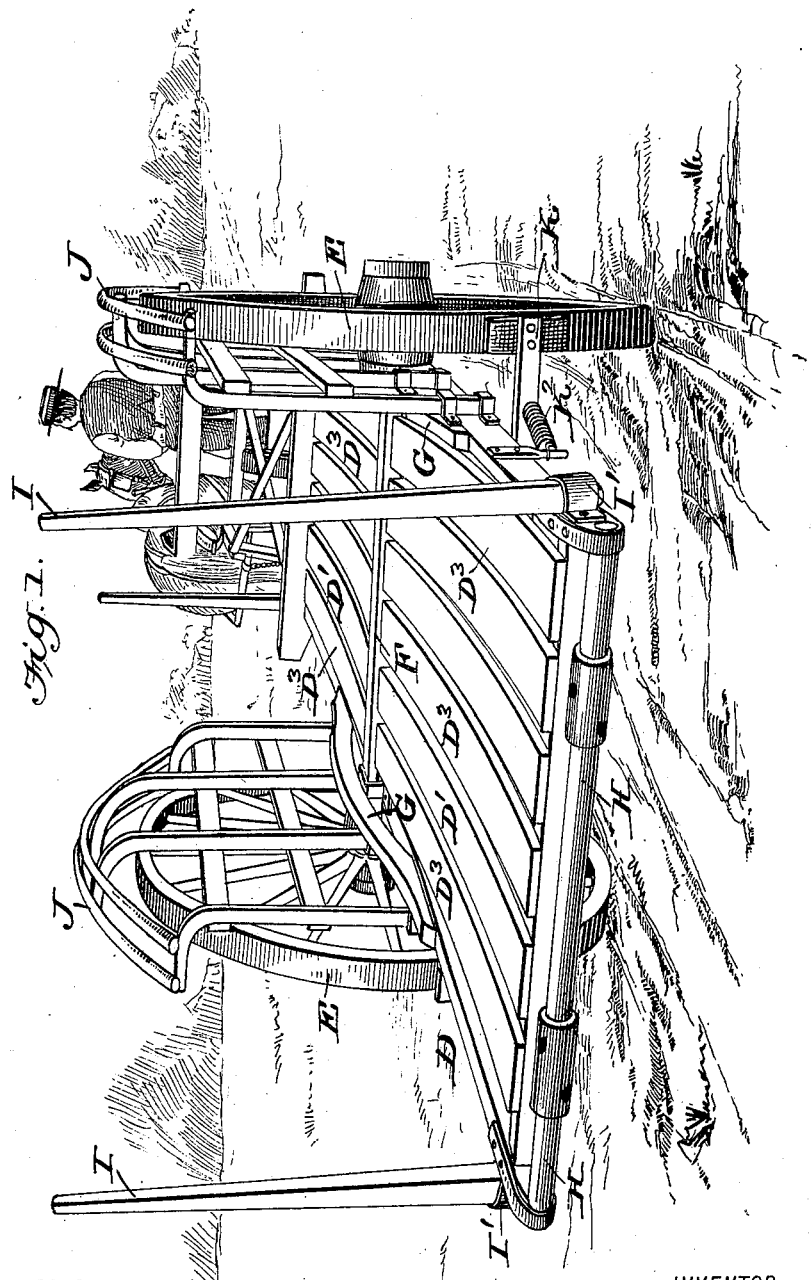
WITNESSES:
Jos. A. Ryan
Perry B. Turpin.
INVENTOR
Jean Rey.
BY Munn & Co.
ATTORNEYS
THE NORRIS PETERS CO., PHOTO-LITHO., WASHINGTON, D. C.

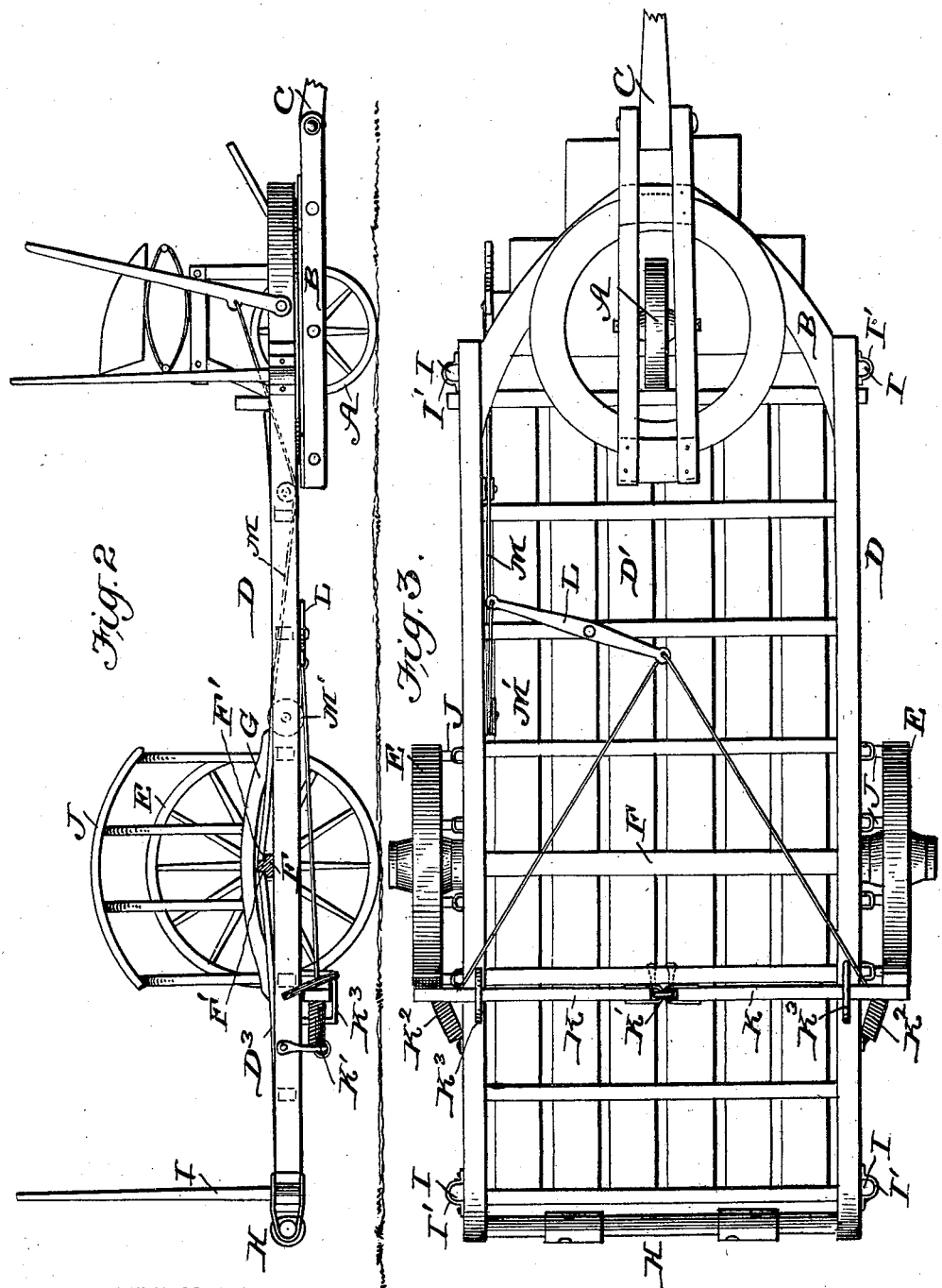

UNITED STATES PATENT OFFICE.

JEAN REY, OF MAXWELL, CALIFORNIA.

VEHICLE.

SPECIFICATION forming part of Letters Patent No. 674,318, dated May 14, 1901.

Application filed September 4, 1900. Serial No. 28,979. (No model.)

*To all whom it may concern:*

Be it known that I, JEAN REY, residing at Maxwell, in the county of Colusa and State of California, have invented a new and useful Improvement in Vehicles, of which the following is a specification.

My invention is a three-wheeled wagon which is especially adapted for farm and city use, as well as all places or purposes for which a wagon or dray can be used; and the invention consists in certain novel constructions and combinations of parts, as will be hereinafter described and claimed.

In the drawings, Figure 1 is a perspective view of my wagon. Fig. 2 is a side view, and Fig. 3 is a bottom plan view, thereof.

My improved vehicle has one front wheel A supported in a pivoted frame B, to which is attached the tongue C, so the wagon can be turned in its length. This construction is also important, as by employing but one front wheel the tongue or pole of the wagon will not swing from right to left, but will be held steady, thus avoiding striking the legs of the animals.

The platform D of the wagon is supported at its front end on the pivoted frame B and at a point between its front and rear ends on the two large wheels E, whose axle F extends above the bed of the wagon and is suitably secured, side bars G being arranged to overlie the axle at the edges of the bed. It will be noticed that the inner ends of the hubs of the wheels fit snugly or closely to the sides of the bed or platform D, which throws the weight of the load close to the wheels, so the axle will sustain a comparatively great weight and a wide platform is formed to receive the load. By the described construction the platform is hung very low, which facilitates loading and also decreases the danger of the wagon turning over. The platform D comprises a number of flat boards or bars D', which curve upwardly toward the axle and also toward the rear end of the platform, forming a depression at $D^3$, which aids in holding the load in place. At the rear end of the platform is provided a transverse shaft H, which may be used in connection with a cable or rope to bind the load.

Stakes I are supported in sockets I' at the rear end of the platform, and racks J are detachably connected with the platform along the inner sides of the wheels and may be employed in hauling hay, straw, fodder, or the like. These racks J have their upper ends curved outwardly over the wheels to prevent the load from coming in contact with the wheels.

The brake comprises the two lever-arms K, pivoted at their inner ends at K' and provided at their outer ends with shoes to engage the wheels E. At their outer ends the levers K are actuated by springs $K^2$, which tend to free them from engagement with the wheels. Near their outer ends the levers K are held and guided in loop $K^3$. An intermediate lever L is pivoted between its ends and has its inner end connected with the outer ends of the brake-levers K. The outer end of the lever L is connected by a suitable line M, passing over a guide-pulley M', with the handle-lever N, so the latter can be operated to set the brakes with great force.

In the construction shown the axle is shouldered at F' to form seats for the ends of the bed-slats D', which are rested thereon, as shown.

Having thus described my invention, what I claim, and desire to secure by Letters Patent, is—

1. The herein-described vehicle, having an axle F shouldered at F' forming rabbeted seats on its upper side for the ends of the slats, the wagon bed or platform having slats fitting at their adjacent ends in said rabbeted seats, the wheels on said axle, the vertically-pivoted frame at the front end of the bed or platform and the front wheel supported in said frame, substantially as set forth.

2. The vehicle herein described comprising the platform provided at its rear end with the transverse shaft, the stakes at the rear end of the platform, the side wheels, the axle therefor extended above the platform at a point between the front and rear ends thereof, the front wheel and its frame, and the side racks fitted removably to the platform and having outwardly-extended portions projecting over the side wheels, substantially as set forth.

3. A vehicle substantially as herein described, having an axle formed on its upper side with opposite longitudinally-extending shoulders below its top and forming rabbeted seats, the wheels on said axle, the side racks having outwardly-extending portions projecting over the side wheels, the bed or platform having slats fitting at their ends in the opposite rabbeted seats of the axle, and the front wheel and its supporting-frame, substantially as set forth.

JEAN REY.

Witnesses:
CURTIS COOK,
J. E. BARTHOLOMEW.